United States Patent Office 3,458,294
Patented July 29, 1969

3,458,294
VISCOUS EMULSION OF LIQUID HYDROCARBON
James Nixon, Westfield, Thomas J. Wallace, Elizabeth, and Alan Beerbower, Westfield, N.J., assignors to Esso Research and Engineering Company, a corporation of Delaware
No Drawing. Continuation-in-part of application Ser. No. 586,021, Oct. 12, 1966. This application Mar. 16, 1967, Ser. No. 623,560
Int. Cl. C10l 1/22, 1/18
U.S. Cl. 44—51                                    19 Claims

ABSTRACT OF THE DISCLOSURE

A stable emulsion of liquid hydrocarbon is prepared having as the disperse phase a major proportion of a liquid hydrocarbon and having as the continuous phase a minor proportion of a polar organic liquid, the latter including, but not being limited to, formamide, ethylene glycol, formamide-urea mixtures, glycol-formamide mixtures and the like. The emulsion reduces fire hazards and yet does not impair the use of the hydrocarbon as a solvent or as a fuel for aircraft, automotive vehicles and the like.

CROSS-REFERENCE TO RELATED APPLICATIONS

This application is a continuation-in-part of Ser. No. 586,021, filed Oct. 12, 1966, and now abandoned.

DESCRIPTION OF THE INVENTION

The present invention relates to an emulsified liquid hydrocarbon wherein at least 75 weight percent of the discontinuous or dispersed phase is a liquid hydrocarbon. The emulsion is stable and is highly viscous so that under low shearing forces it will not flow rapidly from a ruptured fuel tank and yet it can be easily pumped to permit it to be burned in an engine. The emulsion of this invention is unique in that in at least one embodiment it can be prepared with as much as 99 weight percent liquid hydrocarbon as the discontinuous phase and with no water present, essentially all of the composition being combustible, and in other embodiments it can be prepared with more than 98 weight percent liquid hydrocarbon and with no more than about 0.5 to 0.7 weight percent of water present.

There has been an ever-increasing need for a hydrocarbon fuel, particularly for aircraft, that will not present a fire hazard when the fuel tanks or the low pressure fuel lines are punctured or ruptured, as for example during an accidental crash or during warfare when the tanks or fuel lines can be punctured by enemy missiles. This hazard can also exist in automotive vehicles. Much of the hazard that arises upon the rupture of fuel tanks or fuel lines is associated with the atomization of the fuel by the force of impact. The atomized fuel thus produced ignites very easily and burns very rapidly. This hazard is minimized or eliminated if an emulsion is provided that is sufficiently viscous to prevent the rapid flow of the fuel by ordinary gravity forces.

There is also a related need for rendering other inflammable liquid hydrocarbon compositions such as solvents, dry cleaning fluids, and the like less hazardous, and here again the hazard can be reduced by preparing a viscous emulsion of the hydrocarbon.

It has previously been known to prepare emulsions of liquid hydrocarbons. Such emulsions have usually contained a maximum of no more than about 60 to 70 wt. percent hydrocarbon as the dispersed phase. Emulsions that have been prepared with higher hydrocarbon contents have usually had the hydrocarbon as the continuous phase. Such an emulsion would not be of any particular value in solving the problem of rendering the hydrocarbon relatively non-flowing since an emulsion in which the hydrocarbon is the continuous phase would not be sufficiently more viscous than the hydrocarbon itself.

Although in some instances it has been possible to prepare hydrocarbon emulsions of high liquid hydrocarbon content (90% or more) as the dispersed phase, such emulsions have usually not possessed satisfactory stability. The emulsions prepared in accordance with the present invention are more stable than the prior art emulsions having a high liquid hydrocarbon content as the continuous phase. Also, since it is possible to prepare a composition in which essentially all of the components are combustible, there is essentially no loss in the heating value of the hydrocarbon in such a composition as compared with the non-emulsified hydrocarbon. Furthermore, in those embodiments in which there is no water present, the corrosion problem that has been previously encountered with aqueous emulsions is eliminated. In fact, even in embodiments in which the total water content does not exceed 0.5 to 0.7 wt. percent the corrosion problem is either essentially non-existent, or at the very minimum very largely eliminated.

An emulsion consists of a dispersion of one liquid phase inside of a second immiscible liquid phase. An emulsion containing a high percentage of an internal dispersed phase exerts a phenomenon known as "yield stress." (See ASTM D2507 "Tentative Definition of Terms Relating to Rheological Properties of Gelled Rocket Propellants.") Under conditions of low shearing stress, such an emulsion will not flow freely. When a sufficiently large shearing stress is applied, the "apparent viscosity" of the emulsion decreases and the material will flow much more readily. If a critical rate of shear is not exceeded, so as to break down the emulsion, the material will regain its much more viscous state once the shear stress is removed.

It is to be noted that the highly viscous, or pseudoplastic, emulsions of this invention are to be distinguished from gels. A gel consists of a solid three-dimensional network intertwined with a similar liquid network wherein neither network is entirely within the other. When a gel is made to flow, under stress, the inter-connectivity of the networks is broken down, and must be re-established in order for the gel to set again. In contrast, in a pseudoplastic emulsion of the type involving the present invention, each droplet of the dispersed phase is actually inside the continuous phase at all times, and flow under stress merely involves a temporary change of geometric configuration.

This geometric configuration is envisioned as a plurality of distorted spheres or dodecahedra of the dispersed liquid hydrocarbon phase, each of which is completely surrounded by a film of the continuous phase liquid. The continuous phase liquid contains an emulsifier or surfactant to enable the continuous phase liquid to form a film that will effectively prevent coalescence of the dispersed droplets of hydrocarbon.

In accordance with the prevent invention it has now been surprisingly found that a viscous or pseudoplastic stable emulsion containing, as the disperse phase, at least 75% of liquid hydrocarbon and as much as 99% of the hydrocarbon, can be prepared by employing one or more of certain non-aqueous organic liquid media as the continuous phase. More particularly, the non-aqueous media employed in accordance with the present invention are highly polar organic liquids that have relatively high dielectric constants. Representative materials include formamide, dimethyl acetamide, diethyl formamide, dimethyl sulfoxide, propylene carbonate, glycidol, ethylene glycol, and dimethyl formamide. The materials that can be employed as the continuous phase can be characterized as those having dielectric constants greater than 25 and solubility parameters of greater than 10. Although it is not a critical feature of the invention, there is some advantage in having the freezing point of the continuous phase be not much above 40° F. so that the emulsion will be stable at relatively low temperatures.

Tabulated below are the characteristics of some of the polar materials that are suitable for use as the continuous or dispersing phase of the emulsions of this invention. For comparison, the properties of water and of petroleum hydrocarbon jet fuel are also given in the tabulation.

| Substance | Freezing pt., ° F. | Boiling pt., ° F. | Dielectric constant | Solubility parameter (a) |
|---|---|---|---|---|
| Formamide | 32 | 451 | 109 | 18 |
| Dimethyl formamide | −70 | 392 | 37 | 12 |
| Dimethyl sulfoxide | 65 | 365 | 45 | 13 |
| Formic acid | 47 | 213 | 58 | 12.1 |
| Glycerol | (b)32 | 564 | 45 | 16.5 |
| Ethylene glycol | 1 | 387 | 41 | 14.2 |
| JP-4 jet fuel | <−70 | (IBP) 140 | 2 | 7 |
| Water | 32 | 212 | 80 | 23.4 | a Calculated as square root of energy of vaporization per molar volume, √g.cal/mole/cc. by method of J. H. Hildebrand "Solubility of Non-Electrolytes," 3rd edition, Reinhold Publishing Corporation, New York, 1950.
b Crystallizes slowly at this temperature; melting point of crystals is higher.

It is of course necessary that the continuous phase liquid be immiscible with the liquid hydrocarbon.

Formamide is one substance that is preferred as the continuous phase material for use in this invention because it permits the preparation of an essentially water-free emulsion which can contain as much as 99 wt. percent of liquid hydrocarbon, the balance being dispersing agent and continuous phase material. With a number of the other continuous phase materials coming within the scope of the invention, it is necessary to have some water present. With proper modification of the system, however, it is also possible to eliminate the need for water, even when using some of the latter materials, such as ethylene glycol, propylene glycol, or glycerol.

In the case of formamide, low temperature stability can be improved by employing mixtures of formamide with certain solid amides, provided the mixtures are still liquid at ambient temperatures. The solid amides are characterized as those having from one to three carbon atoms, two amino groups and zero to two imino groups. Such solid amides include urea, oxamide, and guanidine. Usually, in these mixtures from 50 to 85% of the mixture will be formamide and the balance of the mixture will be one or more of the solid amides.

In the case of ethylene glycol, propylene glycol and glycerol, it is possible to eliminate the need for water in making a stable emulsion by employing a mixture of the glycol or glycerol with from 5 to 30% of urea, or preferably with from 10 to 20% of urea. Also, water-free emulsions can be prepared using a mixture of from 60 to 90% formamide and from 10 to 40% of ethylene glycol. Other completely non-aqueous emulsions in which a glycol or glycerol is employed as the continuous phase are possible by substituting for the water small proportions of $C_8$ to $C_{18}$ fatty alcohol or fatty acid, e.g., lauryl alcohol.

The hydrocarbons that form the dispersed phase in the emulsions of the present invention include those boiling within the range of about 70 to 750° F., e.g. petroleum fractions, such as gas oils, kerosene, motor gasoline, aviation gasoline, aviation turbo jet fuels, diesel fuels, Stoddard solvent, and the like, as well as coal tar hydrocarbons such as coal tar solvent naphtha, benzene, xylene, hydrocarbon fuels from coal gasification, shale oil distillates, and the like. Gasoline is defined as a mixture of liquid hydrocarbons having an initial boiling point in the range of about 70 to 135° F. and a final boiling point in the range of about 250 to 450° F. Most usually gasolines are identified as either motor gasolines or aviation gasolines. Motor gasolines normally have boiling ranges between about 70° and 450° F., while aviation gasolines have narrower boiling ranges between about 100° and 330° F. Gasolines are composed of a mixture of various types of hydrocarbons, including aromatics, olefins, paraffins, isoparaffins, and naphthenes. Stoddard solvent generally has a boiling range of about 300 to 400° F. Diesel fuels include those defined by ASTM Specification D-975-53T. Jet fuels generally have boiling ranges within the limits of about 150° to 600° F. Jet fuels are usually designated by the terms JP-4, JP-5, or JP-6. JP-4 and JP-5 fuels are defined by U.S. military specification MIL-T5624-G. Aviation turbine fuels boiling in the range of 200° to 550° F. are defined by ASTM specification D-1655-59T. The following are the characteristics of a typical jet fuel:

JP-4 FUEL

Reed Vapor Pressure—2.20; API Gravity—53.5; Freezing Point—Max. −76° F.

ASTM D-86 Distillation ° F.

| | |
|---|---|
| IBP | 140 |
| 10% | 251 |
| 20% | 278 |
| 30% | 300 |
| 50% | 326 |
| 80% | 383 |
| 95% | 445 |
| EP | 473 |

In order to prepare a satisfactory emulsion of hydrocarbon fuel for use in engines, a non-metal-containing emulsifier is preferred in the practice of this invention. The best balance of forces of attraction between the hydrocarbon phase and the continuous phase of the emulsion is obtained by using a combination of two or more emulsifiers. For most satisfactory results, the lipophilic portion of the emulsifier must closely match the particular hydrocarbon or hydrocarbon fraction being dispersed. To attain the proper balance between lipophilic and non-lipophilic (i.e., hydrophilic) forces in the emulsifier system, it is convenient to use the scale of HLB values known to the emulsifier art. These are discussed by W. C. Griffin in the Journal of the Society of Cosmetic Chemistry, December 1948, p. 419; also in Kirk-Othmer Encyclopedia of Chemical Technology, second edition, vol. 8, pp. 131–133 (1965). Desired HLB values can be obtained by using two or more emulsifiers in combination. Emulsifiers and emulsifier combinations which give HLB values in the range of 11–16 are satisfactory for producing a stable emulsion in the present invention when the continuous phase material is formamide. Formamide gives the greatest latitude in the selection of emulsifiers that may be used. This is believed to be because of the strong hydrogen bonding in formamide. Mixtures of formamide and solid amides such as urea appear to give the most satisfactory emulsions when using non-ionic emulsifiers having HLB values in the 11–14 range. With polar organic liquids within the scope of this invention that are used in conjunction with amides or with small amounts of water, such as ethylene glycol, the effective HLB value will depend on the particular liquid selected and will vary with the proportion of water or amide to the said organic liquid constituting the continuous phase.

Among the surfactants or emulsifiers that may be employed in the present invention are included alkylphenyl polyethylene glycol ethers such as Tergitol NPX of Carbide and Carbon Company; polyethylene polyoxypropylene glycol such as Pluronic L-64 of Wyandotte Chemical Company; rosin acid esters of polyoxyethylene glycol such as Ethofat 242/25 of Armour Industrial Chemical Company; and alkylphenyl polyethoxy alkanols, such as Triton X-102 which is iso-octyl phenyl polyethoxy ethanol, i.e., the reaction product of iso-octylphenol and ethylene oxide. The alkyl phenyl polyalkoxy alkanols are obtained by reacting 5 to 15 molar proportions of a $C_2$ to $C_3$ alkylene oxide with one molar proportion of an alkyl phenol having a $C_5$ to $C_{12}$ alkyl group, e.g., the reaction product of 6 moles of propylene oxide with one mole of dodecyl phenol, the reaction product of a mixture of 5 moles of ethylene oxide and 5 moles of propylene oxide with one mole of nonyl phenol, and the reaction product of 8 to 10 moles of ethylene oxide with one mole of iso-octyl phenol. These are included within a broader class of materials having the formulas:

$$RA(CH_2CH_2O)_xCH_2CH_2OH$$

or $$RA(CH_2CH_2CH_2O)_xCH_2CH_2CH_2OH$$

where R is a $C_8$ to $C_{18}$ hydrocarbon group, A is oxygen or sulfur and $x$ is 8 to 20.

Other emulsifiers include the fatty acid esters of sorbitan, such as sorbitan monolaurate, sorbitan monostearate, sorbitan monopalmitate and the alkoxylated fatty acid esters of sorbitan such as polyoxyethylene sorbitan monostearate, tristearate or trioleate. The various sorbitan esters of fatty acids are well known to the art as spans, and the polyoxyethylene derivatives of the sorbitan esters of fatty acids are well known as tweens. Still other suitable emulsifiers include N-alkyl trimethylene diamine dioleate of Armour and Company, octakis (2-hydroxy propyl) sucrose, the condensation products of fatty acid amides and ethylene oxide, the ethoxylated fatty alcohols, polyoxyethylene monostearate, polyoxyethylene monolaurate, propylene glycol mono-oleate, glycerol monostearate, ethanolamine fatty acid salts stearyl dimethyl benzene ammonium chloride, various gums such as gum tragacanth, gum acacia, etc. Where the presence of metal is not objectionable in the emulsion, metal-containing emulsifiers can also be used, such as sodium dioctyl sulfosuccinate (Aerosol OT) or disodium N-octadecyl sulfosuccinamate (Aerosol 18).

An extensive list of emulsifiers together with their HLB values is given in Kirk-Othmer Encyclopedia of Chemical Technology, second edition, vol. 8, pp 128-130 (1965). From this list it is possible to select those that either alone or in admixture will give an HLB value suitable for use in the present invention.

The liquid hydrocarbon emulsion of the present invention using formamide, formamide-solid amide mixtures, formamide-glycol mixtures and the like, as the continuous phase will contain the following broad and preferred ranges of components:

| Component | Wt. percent concentration | |
|---|---|---|
| | Broad | Preferred |
| Hydrocarbon | 75–99 | 90–99 |
| Continuous phase material | 0.5–20 | 0.5–8 |
| Dispersing agent | 0.5–10 | 0.5–5 |

Most preferred is an emulsion wherein the discontinuous hydrocarbon phase makes up 96 to 99 wt. percent of the emulsion.

In the case of continuous phase components where some water is present the component ranges will be slightly different, i.e.

| Component | Wt. percent concentration | |
|---|---|---|
| | Broad | Preferred |
| Hydrocarbon | 80–98 | 95–98 |
| Continuous phase material | 1.5–18 | 1.5–3.5 |
| Dispersing agent | 0.5–10 | 0.5–2.5 |

The proportion of water to organic liquid continuous phase material in those cases where water is used, e.g., when using ethylene glycol, glycerol, 2-pyrrolidone, N,N-dimethyl acetamide, etc., will generally range between about 30 wt. percent water and 70 wt. percent organic liquid and about 60% water and 40% organic liquid. In most cases no more than 50 wt. percent of the continuous phase should be water.

The proportions of liquid hydrocarbon to continuous phase and to emulsifier or surfactant should be such as to prepare an emulsion having a yield stress in the range of about 800 to about 3500, or more usually about 1000 to 3000 dynes per square centimeter, as measured by the ASTM D217 Penetrometer, or by equivalent means or methods such as the ASTM D-1902 viscometer extrapolated back to zero rate of shear, or the rising sphere yield stress method MIL-P-27421. The limiting yield stress values are determined by the need to have a viscosity that is practical for pumping through a conventional fuel system of fuel pumps and fuel lines and yet provide a fuel emulsion that will not flow readily through penetrations of the wall of the fuel tank. For conventional jet aircraft, both civilian and military, yield stress values in the range of about 1400 to 2500 are particularly useful. The most desired yield stress is one that will restrict the flow out of a punctured, ruptured or split fuel tank or fuel line to a moderate rate under the existing hydrostatic head so that the fuel will not spray and form the ball of highly inflammable mist that usually occurs with an unmodified fuel. The nature of the flow with the emulsion of the invention is much akin to the flow of toothpaste from the conventional collapsible tube, forming a mass of pile instead of a rapidly spreading puddle. Thus, while the emulsion mass is still capable of catching on fire, it will be contained within an area that can be much more readily brought under control than in the case of unthickened fuel.

In preparing the emulsion, it is preferred to mix the dispersing agents with the liquid hydrocarbon and to then add the resulting mixture to the continuous phase material with stirring. Alternatively, with two emulsifiers, one of which is lipophilic and the other hydrophilic, the lipophilic portion can be added to the hydrocarbon phase and the hydrophilic portion added to the continuous phase. The rate of stirring is critical and cannot exceed a peripheral speed of about 5 feet per second; usually the peripheral speed of stirring will be in the range of about 0.5 to 2 feet per second. Thus, low speed (e.g., 150 to 300 r.p.m.) impeller stirrers or gear pumps may be used for mixing, but high speed blenders or colloid mills, e.g., those running at 1500 to 3000 r.p.m. cannot be used. If the mixing speed is too high, the emulsion tends to break down. The limiting rate of shear during preparation is indicated by the fact that once the emulsion is formed a rate of shear of about 10,000 reciprocal seconds is borderline for emulsion stability when running the emulsion through pipes, valves, filters, and other components of a transfer system. Preferably in such handling the rate of shear should not exceed about 5000 reciprocal seconds. Either batch operation or continuous operation can be used for emulsion preparation. Ambient temperatures are normally suitable. In a continuous process in-line mixing can be used. A modification of the continuous system for grease manufacture disclosed in the Calkins Patent U.S. 2,318,668, can be used, wherein the components are fed into a mixing zone through gear pumps controlled by an automatic proportioner, the major modification being that the mixer will be low speed.

When preparing emulsions containing either ethylene glycol, propylene glycol, glycerol, or 2-pyrrolidone, plus water, as the continuous phase, the best results are obtained if water is not added to the continuous phase prior to emulsification, but if the water is instead added after emulsification has been started. The glycol or similar organic liquid is charged to a stirred vessel and then addition of the hydrocarbon containing the emulsifier is begun. After about 50% dispersed phase has been achieved, the system begins to decrease in viscosity. When this point is reached, the water is added. The resultant emulsions are much more viscous, i.e., have a higher yield stress than they would have if the water had been premixed with the nonaqueous portion of the continuous phase. In addition, by following this procedure the process is far less critical with respect to tendency for the emulsion to break during its manufacture.

The nature of this invention will be more fully understood when reference is made to the following examples which include a preferred embodiment.

EXAMPLE 1

Several emulsions were prepared in which the continuous phase material was formamide and the dispersed phase was JP-4 jet fuel. The emulsifier was a mixture of sorbitan monooleate (Span 80) and either polyoxyethylene sorbitan monopalmitate (Tween 40) or polyoxyethylene sorbitan monooleate (Tween 80). In each case the continuous phase material, i.e., formamide, was charged at room temperature to a stirred vessel using a paddle type low-speed stirrer and then over a period of time the mixture of the hydrocarbon and the emulsifier was added. In each case the resultant emulsion was highly viscous and stable. Each of the emulsions was evaluated for its yield stress and for its stability. The stability test measured the extent of separation of the emulsion under three sets of conditions, one being at the end of six cycles of heating and cooling, wherein in each cycle the mixture is held at 130° F. for six hours, cooled to room temperature and heated again for another six hours, again cooled to room temperature, etc. The second set of conditions measured the degree of separation at −20° F. after three 16-hour cycles of freezing and thawing, and the third measured the extent of separation after storing at room temperature for 30 days. The composition of each of the emulsions prepared, the HLB values of the emulsifiers, and the properties that were determined for each of the emulsions are given in the following Table I. The HLB values are within plus or minus 1.

of formamide and 3 wt. percent of emulsifier consisting of 28% Span 80 and 72 wt. percent of Tween 80 (HLB-12). The resulting emulsion has a yield stress of about 800 dynes per square centimeter. It is stable on storage for 30 days at room temperature and also shows no separation after six 16-hour freeze-thaw cycles. Separation after six 6-hour cycles at 130° F. is about 2 wt. percent.

EXAMPLE 4

In the same manner as described in Example 1, an emulsion was prepared using 97 wt. percent of JP-4 jet fuel, 1.5 wt. percent of formamide and 1.5 wt. percent of a polyoxyethylene oleyl ether (10 moles of ethylene per mole of oleyl alcohol) identified as Brij 96 from Atlas Chemical Company (HLB 12.4±1). The resulting emulsion had a yield stress of about 3000 dynes per square centimeter. In the stability test described in Example 1, the emulsion showed 0% separation after three 16-hour cycles at −20° F., 0% separation at the end of 30 days and 2% separation at the end of three 6-hour cycles at 130° F.

EXAMPLE 5

Additional viscous emulsions were prepared in the manner of Example 1 using 97% JP-4 fuel as the dispersed phase, 1.5 wt. percent formamide as the continuous phase, and 1.5 wt. percent of an emulsifier having an HLB value of about 12±1. In those cases where only ionic emulsifiers were used, stability could be improved by adding 5 to 15% by weight, based on the ionic emulsifier, of a nonionic emulsifier or of cetyl alcohol or stearic acid. The emulsifiers used in the respective emulsions were as follows:

Preparation A—Emulsifier: 78% Triton N-128 and 22% Triton X-15 (alkylaryl ether alcohols)
Preparation B—Emulsifier: 68% Brij 92 and 32% Brij 98 polyoxyethylene oleyl ethers)

TABLE I

| | Composition, wt. percent | | | Properties | | | |
| --- | --- | --- | --- | --- | --- | --- | --- |
| | | | | Yield Stress, dynes/cm.$^2$ | Stability, vol. percent separation | | |
| | Jet fuel | Formamide | Emulsifier | | High temp.[1] | Freeze-thaw [2] | Room temp.[3] |
| 1 | 97 | 1.5 | (a)1.5 | 1,725 | 2.0 | 0 | 0 |
| 2 | 97 | 1.5 | (b)1.5 | 2,000 | 1.5 | 0 | 0 |
| 3 | 97 | 1.5 | (c)1.5 | 2,500 | 2.0 | 0 | 0 |
| 4 | 96 | 2.0 | (a)2 | 2,700 | 2.0 | 0 | 0 |
| 5 | 97 | 1.5 | (d)1.5 | 2,500 | 0.5 | 0 | 0 |

[1] After six 6-hour cycles at 130° F.
[2] After three 16-hour freeze-thaw cycles.
[3] After 30 days at room temperature.

(a) 37 Span 80; 63% Tween 80. (HLB-11)
(b) 28% Span 80; 72% Tween 80. (HLB-12)
(c) 19% Span 80; 81% Tween 80. (HLB-13).
(d) 68% Tween 40; 32% Span 80. (HLB-12).

EXAMPLE 2

The preparation of composition 2 of Example 1 was repeated on a plant scale, using about 97.5 wt. percent of JP-4 jet fuel and proportionately less of equal amounts of the formamide and of emulsifier mixture (b) (Table I) having an HLB value of 12. Mixing was effected by circulating the continuous phase material through an external recycle line equipped with a gear pump, the JP-4 fuel plus emulsifier being fed to the suction side of the pump. Jet fuel was fed into the system at such a rate that at no time was the amount of non-emulsified fuel in the mixing vessel allowed to exceed about 1 percent of the material in the vessel, thus ensuring that the emulsion already formed could not break. The resulting emulsion had a yield stress of about 1700 dynes per square centimeter.

EXAMPLE 3

In the manner described in Example 1, an emulsion is made using 80 wt. percent of JP-4 jet fuel, 17 wt. percent Preparation C—Emulsifier: 72% Priminox T-1M and 28% Priminox T-25—Rohm & Haas (cationic emulsifiers prepared by ethylene oxide treatment of $C_{12}$-$C_{22}$ aliphatic amines)
Preparation D—Emulsifier: 75% Pluronic L-64 and 25% Pluronic L-61 (propylene glycol reacted with propylene oxide and ethylene oxide)
Preparation E—Emulsifier: 33% Tetronic 703 and 67% Tetronic 908 (ethylene diamine reacted with propylene oxide and ethylene oxide)
Preparation F—Emulsifier: Aerosol C-61—American Cyanamid—(octadecyl amine salts and octadecyl guanidine salts of octadecyl carbamic acid)

EXAMPLE 6

In the manner of Example 1, two separate emulsions were prepared using 97% of a hydrocarbon fuel, 1.5% of formamide, and 1.5 wt. percent of an emulsifier consisting of 28% of sorbitan monooleate (Span 80) and 72 wt. percent of polyethoxylated sorbitan monooleate (Tween 80). The properties of these emulsions are given in the following Table II.

TABLE II

| Fuel Used in Emulsion | Yield Stress, dynes/cm.² | Stability, vol. percent separation | | |
|---|---|---|---|---|
| | | High temp.[1] | Freeze-thaw [2] | Room temp.[3] |
| Aviation fuel 100 ON | 2,000 | 2.0 | 0.0 | 0.0 |
| Diesel fuel regular #1 grade | 2,000 | 1.0 | 0.0 | 0.0 |

[1] After three 6-hour cycles at 130° F.
[2] After three 16-hour freeze-thaw cycles.
[3] After 30 days at room temperature.

EXAMPLE 7

Using the procedure of Example 1, three separate emulsions were prepared comprising 97% of JP-4 jet fuel as the dispersed phase, 1.5 wt. percent of a mixture of formamide and a solid amide as the continuous phase, and 1.5 wt. percent of an emulsifier consisting of 28 wt. percent Span 80 and 72 wt. percent of Tween 80. The following Table III gives the compositions of the various mixtures of formamide and solid amide and the yield stress and stability test results for each of these emulsions.

EXAMPLE 9

This example illustrates the preparation of emulsions using glycols, but omitting the water and substituting lauryl alcohol. In each case the emulsion consists of 97% JP-4 jet fuel, 1.5 wt. percent of the glycol, 0.5 wt. percent of lauryl alcohol and 1.5 wt. percent of either ammonium lauryl sulfate or diethanolamine lauryl sulfate as the emulsifier. The procedure that was used involved adding the lauryl alcohol to the jet fuel and adding the emulsifier to the glycol continuous phase. Then the JP-4 fuel containing the alcohol was added to the continuous phase plus emulsifier in a stirred reactor until all of the hydrocarbon mixture had been added. The resulting emulsions were viscous and stable and varied in appearance from opaqueness to a bluish transparency. The yield stress results in each instance are given in Table V.

TABLE V

| Continuous phase material [1] | Emulsifier [2] | Yield stress, dynes/cm.² |
|---|---|---|
| Propylene glycol | Sipon LD | 2,000 |
| Ethylene glycol | do | 2,600 |
| Do | Sipex A | 2,000 |
| Propylene glycol | do | 1,800 |

[1] 1.5% plus 0.5% lauryl alcohol.
[2] 1.0% in each case.
Sipon LD is diethanolamine lauryl sulfate; Sipex A is ammonium lauryl sulfate.

TABLE III

| Continuous phase mixtures, wt. percent | Yield stress, dynes/cm.² | Stability, vol. percent separation | | | |
|---|---|---|---|---|---|
| | | High temp.(a) | Room temp. | Low temp.(d) | Freeze-thaw(e) |
| 67% formamide, 33% urea | 1,850 | <1.0 | (b)0.0 | 0.0 | 0.0 |
| 85% formamide, 15% urea | 2,000 | 0.5–1.0 | (b)0.0 | 0.0 | 0.0 |
| 50% formamide, 50% oxamide | 1,500 | | (c)0.0 | 0.0 | |

(a) After three 6-hour cycles at 130° F.
(b) After two weeks.
(c) After five days.
(d) After one 16-hour cycle at −65° F.
(e) After three 16-hour freeze-thaw cycles to −20° F.

EXAMPLE 8

Again using the procedure of Example 1 and employing the same proportions of JP-4 jet fuel and of continuous phase material and the same quantity and type of emulsifier as in Example 7, three emulsions were prepared using in one instance a mixture of ethylene glycol and formamide, in the second instance a mixture of glycerol and formamide, and in the third instance formamide alone, as the continuous phase material. The yield stress measurements, the storage stability results and the corrosivity of each of the emulsions are compared in Table IV.

EXAMPLE 10

In the manner described in Example 1, several emulsions were prepared using in each case as the continuous phase a mixture of a polar organic liquid and water. The compositions of the emulsions, of the continuous phase, and of the emulsion system in each instance are set forth in Table VI, together with the properties of each emulsion. Each emulsion showed zero separation after 30 days at room temperature and also after three 16-hour freeze-thaw cycles at −20° F.

TABLE IV

| Continuous phase material mixtures are percent by weight | Yield stress, dynes/cm.² | Stability, vol. percent separation | | Corrosivity | |
|---|---|---|---|---|---|
| | | High temp.[1] | Low temp.[2] | Copper strip [3] | bronze [4] |
| 30 ethylene glycol, 70 formamide | 1,350 | 5.0 | 0.0 | J-3 | None. |
| 30 glycerol, 70 formamide | 1,250 | 5.0 | 0.0 | J-3 | Do. |
| 100 formamide | 2,000 | 1.0 | 0.0 | J-10 | Mild. |

[1] After 6 hours at 130° F.
[2] After 16 hours at −20° F.
[3] Three hours at 212° F.
[4] At 130° F.

TABLE VI.—SYSTEMS USING CONTINUOUS PHASE CONTAINING WATER

| | Continuous phase | | | | | |
|---|---|---|---|---|---|---|
| | N,N-dimethyl acetamide(a) | Formamide (b) | Formamide (c) | Glycerol (d) | N,N-dimethyl formamide(e) | Dimethyl sulfoxide(f) |
| Composition, wt. percent: | | | | | | |
| JP-4 | 95.0 | 96.0 | 96.0 | 96.0 | 96.0 | 96.0 |
| Continuous phase | 2.5 | 2.0 | 2.0 | 2.0 | 2.0 | 2.0 |
| Emulsifier | 2.5 | 2.0 | 2.0 | 2.0 | 2.0 | 2.0 |
| HLB of emulsifier | (g)12 | (g)12 | (h)13 | (h)13 | (j)14.8 | (k)15 |
| Properties: | | | | | | |
| Yield stress, dynes/cm.$^2$ | 1,500 | 1,900 | 3,550 | 1,000 | 1,500 | 1,200 |
| Percent separation after three 6-hour cycles at 130° F | | 7 | 5 | | | 10 |

(a) 68% N,N-dimethyl acetamide; 32% water.
(b) 57% formamide; 43% water.
(c) 57% formamide; 43% water.
(d) 70% glycerol; 30% water.
(e) 68% DMF and 32% water.
(f) 70% DMSO and 30% water.
(g) 28% Span 80 and 72% Tween 80.
(h) 19% Span 80 and 81.0% Tween 80.
(j) 15% Span 80 and 85% Tween 20 (polyoxethylene sorbitan monolaurate).
(k) 91.5% Tween 20 and 9.5% Span 20 (sorbitan momolaurate).

EXAMPLE 11

Use of mixtures of ethylene glycol and water as the continuous phase enables the preparation of fuel emulsions that are stable to —65° F. In this example, wherein the continuous phase comprised ethylene glycol and water mixtures varying from 48.5 wt. percent to 65 wt. percent of ethylene glycol and from 35 to 51.5 wt. percent of water, all of the emulsions gave zero separation after three 16-hour cycles at —65° F. Each emulsion was prepared in the same manner as described in the preceding examples. The compositions and the yield stress measurements are given in Table VII. In the ethylene glycol systems an emulsifier having a HLB value in the range of about 12 to 14 has been found to be most effective for preparing the emulsions.

VIII that the emulsion prepared from the premixed glycol had a slightly lower yield stress value and was somewhat less stable than the emulsion prepared by adding the water after emulsification had begun.

TABLE VIII.—EFFECT OF ADDING WATER DURING EMULSIFICATION

| | Yield stress, dynes/cm.$^2$ | Stability (vol. percent separation) | | |
|---|---|---|---|---|
| | | Room temp. | High temp.(c) | Freeze-thaw(d) |
| Water premixed with glycol | 1,000 | (a)0.0 | 10–15 | 0.0 |
| Water added at 50% stage | 1,200 | (b)0.0 | 5.0 | 0.0 |

(a) After four weeks.
(b) After two weeks.
(c) After six 6-hour cycles at 130° F.
(d) After six 16-hour cycles at —20° F.
Composition in each case: JP-4 jet fuel, 97 wt. %; ethylene glycol, 0.68 wt. %; water, 0.82 wt. %; Span 80, 0.29 wt. %; Tween 80, 1.21 wt. %.

TABLE VII

| Composition | G | H | J | K | L |
|---|---|---|---|---|---|
| JP-4 fuel, wt. percent | 90 | 97 | 96 | 96 | 97 |
| Glycol-water, wt. percent | (a)5 | (a)1.5 | (a)2 | (b)2 | (c)1.5 |
| Emulsifier, wt. percent | (d)5 | (d)1.5 | (e)1.5 | (d)2 | (f)1.5 |
| Yield stress values, dynes/cm.$^2$ | 850 | 1,000 | 1,200 | 1,500 | 1,000 |

(a) 48.5% ethylene glycol; 51.5% water.
(b) 65% ethylene glycol; 35% water.
(c) 52.5% ethylene glycol; 47.5% water.
(d) 19% Span 80; 81% Tween 80.
(e) 9% Span 80; 91% Tween 80.
(f) 28% Span 60 (sorbitan monostearate); 72% Tween 60 (polyoxyethylene sorbitan monostearate.)

EXAMPLE 12

This example illustrates the effect of adding water to the emulsion after a 50% disperse phase has been achieve, rather than premixing the water with ethylene glycol when the latter material is used as the continuous phase. The emulsifier was added to the JP-4 fuel and the mixture was then added to the continuous phase material in a stirred vessel. In one case the water was permixed with the ethylene glycol and in the other case the water was not added until a 50% dispersed phase had been achieved. It will be seen from the results which are given in Table

EXAMPLE 13

Additional emulsions were prepared using as the continuous phase either ethylene glycol, propylene glycol, glycerol, or 2-pyrrolidone, and using as the emulsifier a combination of Span 80, Triton X-100, and Triton X-405. As described in Example 12, water was not added until a 50% dipsersed phase had been achieved. The compositions of the various emulsions and their properties are given in Table IX.

TABLE IX

| Component | Wt. percent | | | |
|---|---|---|---|---|
| | A | B | C | D |
| Ethylene glycol | 1.20 | | | |
| Propylene glycol | | 1.20 | | |
| Glycerol | | | 1.91 | |
| 2-pyrrolidone | | | | 1.0 |
| Water | 0.80 | 0.80 | 1.09 | 1.0 |
| Span 80 | 0.19 | 0.19 | 0.19 | 0.19 |
| Triton X-405 | 0.275 | 0.275 | 0.275 | 0.275 |
| Triton X-100 | 0.535 | 0.535 | 0.535 | 0.535 |
| JP-4 | 97.0 | 97.0 | 97.0 | 97.0 |
| Properties: | | | | |
| Yield stress (dynes/cm.$^2$) | 2,000 | 2,200 | 2,600 | 1,750 |
| Stability at room temp. after 4 wks. (percent separation) | 0.0 | 0.0 | 0.0 | 0.0 |
| Stability at -20° F. for 16 hrs | 0.0 | 0.0 | 0.0 | 0.0 |

EXAMPLE 14

The emulsion of Example 2 is used to operate a T-53 Lycoming turbo engine. Delivery of the fuel emulsion from the tank to the fuel pump is faciliated by lining the tank with a material that is not easily wet by the fuel emulsion, e.g., polyethylene or Teflon.

Throughout the specification and in the claims, the HLB values are within plus or minus one of the figures given.

In summary, the present invention provides a novel hydrocarbon emulsion wherein as much as 98 to 99 wt. percent of liquid hydrocarbon is present as the discontinuous phase in a continuous phase medium which can be water-free or which can contain a maximum of 0.5 to 0.7 wt. percent of water based on the entire emulsion. The emulsion is essentially non-corrosive, and with a non-metal-containing emulsifier contains no metal and no ash.

The emulsions of this invention are stable through the range of -20 to +130° F. and in some cases are stable as low as -65° F. The emulsions remain stable for a period of at least 30 days at room temperature. They have consistencies that are practical for pumping through conventional engine fuel supply systems and at the same time are sufficiently viscous to prevent rapid flow through penetrations in the walls of a fuel tank. The flow properties of the emulsions depend somewhat on the type of surface involved. In general, any surface that is coated with Teflon, polyethylene, polypropylene or the like is not wetted by these emulsions, so that flow from such surfaces is principally by slippage with low friction. Most other surfaces, e.g. metal, glass, or oxy-polymers, are wetted by these emulsions, and in such instances the flow resembles that of a grease or mayonnaise. By lining a fuel tank with a non-wetted surface, only a few inches of hydrostatic head are required to feed emulsified fuel into a centrifugal booster pump.

The hydrocarbon emulsions of this invention can be used as fuels for any engine employing a fuel injection system. They are highly efficient as fuels because their use can involve a maximum of 1% heat loss as compared with the original nonemulsified fuel. In addition to their use in aircraft, other uses include fuels for military trucks and similar vehicles, marine engines and racing cars, diesel engine fuels, general safety fuel use, fuels for space heating, canned heat for domestic use or for life boat survival kits (to distill sea water), safety solvents or cleaning fluids, cleaning agents for the home, e.g. wall cleaners, etc. By emulsifying a highly flammable material such as naphtha in accordance with the present invention, it is possible to ship that material, e.g., by tanker, and then demulsify the emulsion at the destination, thus reducing shipping hazards. If it is necessary to break the emulsion prior to ultimate use, this can be done by subjecting the emulsion to a high rate of shear, by adding excess non-emulsified liquid hydrocarbon to the emulsion, or by adding such materials as acetone, methanol, isopropyl alcohol, or the like to the emulsion.

What is claimed is:

1. A stable hydrocarbon emulsion having a yield stress in the range of about 800 to 3500 dynes per square centimeter which comprises as a disperse phase from about 75 to 99 wt. percent of a liquid hydrocarbon boiling within the range of 70 to 750° F., from about 0.5 to 20 wt. percent of a polar organic liquid as the continuous phase, said organic liquid being immiscible with said hydrocarbon and having a dielectric constant greater than 25 and a solubility parameter in excess of 10, and from about 0.5 to 10 wt. percent of an organic emulsifier capable of forming said emulsion.

2. Emulsion as defined by claim 1 wherein said polar liquid is formamide.

3. Emulsion as defined by claim 1 wherein said polar liquid is a liquid mixture of from 50 to 85 wt. percent of formamide with from 15 to 50 wt. percent of a solid amide having from 1 to 3 carbon atoms, 2 amino groups, and zero to 2 imino groups.

4. Emulsion as defined by claim 3 which contains from 0.5 to 2 wt. percent of a non-ionic emulsifier having an HLB value in the range of about 11 to 14.

5. Emulsion as defined by claim 1 wherein said polar liquid is a liquid mixture of from 70 to 95% of a polyhydric alcohol selected from the group consisting of ethylene glycol, propylene glycol and glycerol and from 5 to 30% of urea.

6. Emulsion as defined by claim 1 wherein said polar liquid is a liquid mixture of from 50 to 85 wt. percent of formamide with from 15 to 50 wt. percent of urea.

7. Emulsion as defined by claim 1 wherein said polar liquid is a liquid mixture of from 50 to 85 wt. percent of formamide with from 15 to 50 wt. percent of oxamide.

8. Emulsion as defined by claim 1 containing from 0% to 0.7 wt. percent of water, based on the total weight of emulsion.

9. Emulsion as defined by claim 1 wherein said hydrocarbon is a conventional fuel for a jet engine.

10. Emulsion as defined by claim 1 wherein said emulsifier is at least partly non-ionic.

11. Emulsion as defined by claim 1 wherein said emulsifier has an HLB value in the range of about 11 to 16.

12. Emulsion as defined by claim 1 wherein the hydrocarbon content is in the range of 90 to 99 wt. percent.

13. Emulsion as defined by claim 1 having a yield stress in the range of about 1400 to 2500.

14. Emulsion as defined by claim 1 which comprises from 96 to 99 wt. percent of a jet fuel, from 0.5 to 3 wt. percent of formamide and from 0.5 to 2 wt. percent of emulsifier, said emulsifier having an HLB value in the range of about 11 to 16.

15. Emulsion as defined by claim 1 wherein said continuous phase comprises a mixture of said organic liquid and water, said mixture ranging from about 30 wt. percent of water and 70 wt. percent organic liquid to about 60% water and 40% organic liquid.

16. Emulsion as defined by claim 10 wherein said organic liquid is ethylene glycol.

17. A process for preparing the emulsion defined by claim 1 which includes the steps of mixing emulsifier with hydrocarbon and then adding the resulting mixture to a stirred mass of said continuous phase liquid at a rate permitting the presence of no more than about 1% of non-emulsified hydrocarbon at one time in the total of said stirred mass and resulting emulsion, the rate of stirring not exceeding a peripheral speed of about 5 feet per second.

18. Process as defined by claim 17 wherein said emulsion is subjected to a rate of shear that does not exceed 10,000 reciprocal seconds.

19. A method for improving the safety of operation of an engine normally operated with a hydrocarbon fuel which comprises using as the fuel for said engine the emulsion defined by claim 1.

(References on following page)

References Cited

UNITED STATES PATENTS 3,346,494  10/1967  Robbins et al. _____ 44—51 X

FOREIGN PATENTS 974,042  11/1964  Great Britain.

DANIEL E. WYMAN, Primary Examiner
W. J. SHINE, Assistant Examiner

U.S. Cl. X.R.

252—308